United States Patent Office 3,522,349
Patented July 28, 1970

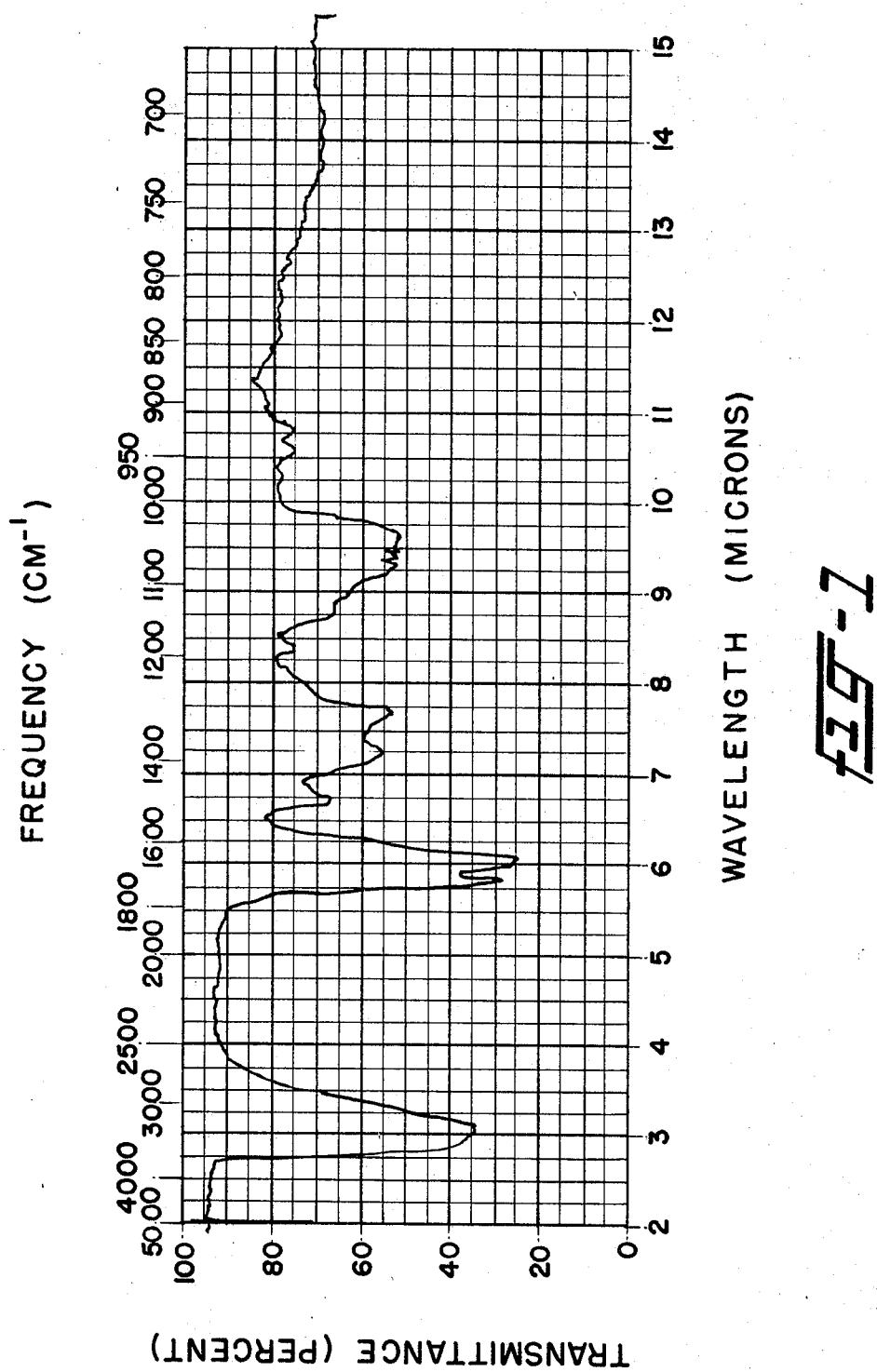

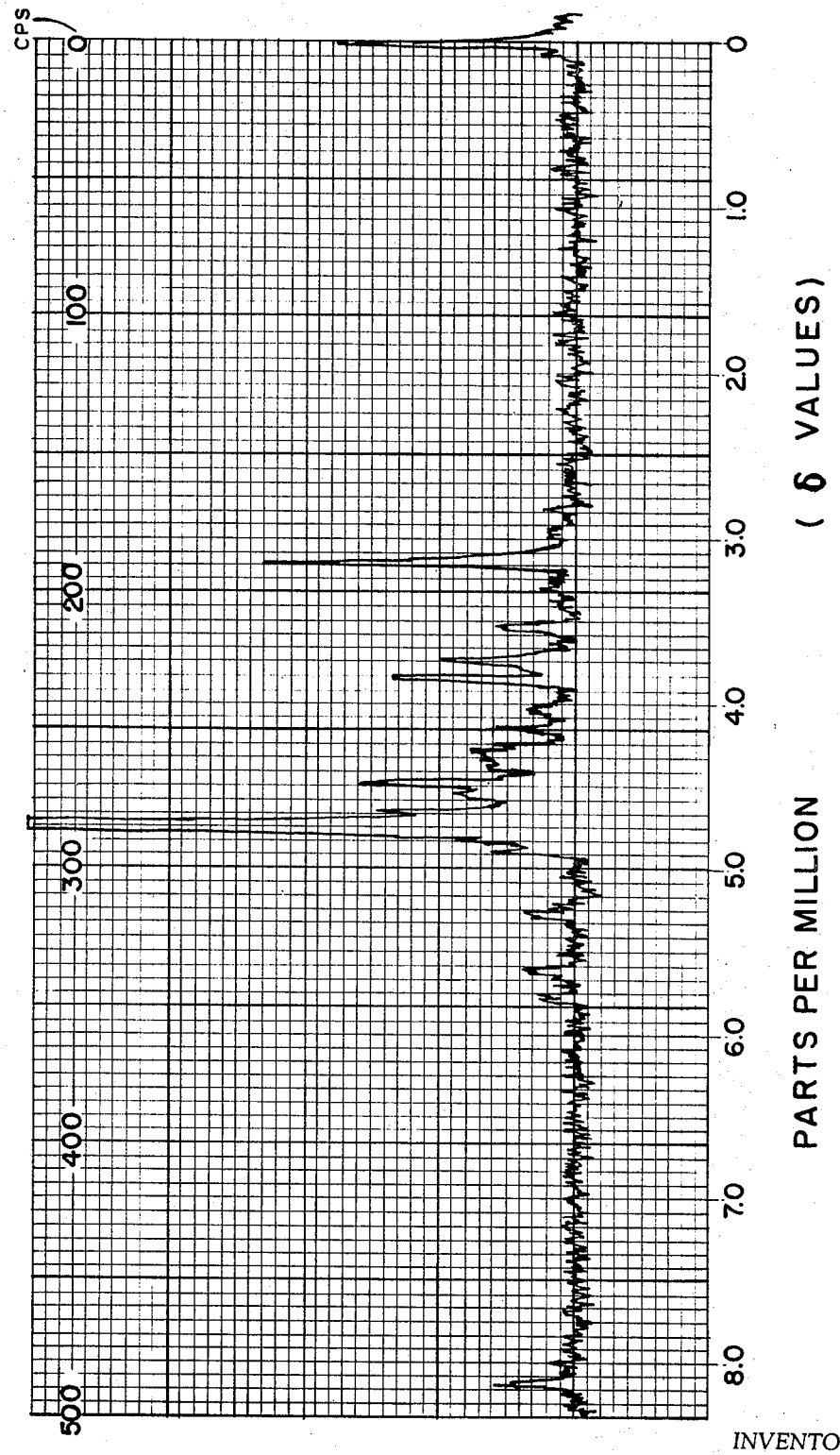

3,522,349
ANTIBIOTIC AC-541 AND PRODUCTION THEREOF
Werner Karl Hausmann, Chazy, Vladimir Zbinovsky, Nanuet, and Anthony Joseph Shay, Pearl River, N.Y., assignors to American Cyanamid Company, Stamford, Conn., a corporation of Maine
Continuation-in-part of application Ser. No. 359,193, Apr. 13, 1964. This application Aug. 27, 1969, Ser. No. 857,282
Int. Cl. A61k 21/00
U.S. Cl. 424—116                      1 Claim

ABSTRACT OF THE DISCLOSURE

A new antibiotic is produced, designated AC-541 by cultivating a new strain of Streptomyces hygroscopicus NRRL 3111. The new antibiotic is active against gram-positive and gram-negative organisms and thus is useful in inhibiting the growth of such bacteria wherever they may be found.

---

This application is a continuation in-part of our co-pending application Ser. No. 359,193, filed Apr. 13, 1964, now abandoned.

This invention relates to a new antibiotic, to its production by fermentation, to methods for its recovery and concentration from crude solutions, to processes for its purification and to methods for the preparation of its salts.

The present invention includes within its scope the antibiotic in dilute forms, as crude concentrates, and in pure crystalline forms. These novel products are active against a variety of microorganisms including gram-positive and gram-negative bacteria. The effects of the new antibiotic on specific microorganisms, together with its chemical and physical properties, differentiate it from previously described antibiotics.

The new antibiotic which we have designated AC-541 is formed during the cultivation under controlled conditions of a new strain of Streptomyces hygroscopicus. A viable culture of the new strain of S. hygroscopicus has been deposited with the Culture Collection Laboratory, Northern Utilization Research and Development Division, U. S. Department of Agriculture, Peoria, Ill., and has been added to its permanent collection. It is freely available in this repository under its Accession Number NRRL 3111.

The following is a general description of the organism based on the diagnostic characteristics observed. The underscored descriptive colors are taken from the "Color Harmony Manual," 3rd ed. (1948).

Amount of growth.—Moderate on most media, light on Czapek's Solution Agar.

Aerial mycelium and/or en masse spore color.—Aerial mycelium whitish becoming Fawn (3 ig or 4 ig) to Beaver (3 li or 4 li) to Beige (3 ge) in sporulation zones. Spore masses developing hygroscopic areas on many media.

Soluble pigment.—Absent on most media; yellowish-brown in light amounts on Tomato Paste Oatmeal agar.

Reverse color.—In cream to tan or light yellowish shades.

Miscellaneous physiological reactions.—Nitrates reduced to nitrites in organic nitrate broth but not in inorganic nitrate broth; good gelatin liquefaction; no chromogenicity on peptone-iron agar. Carbon source utilization according to Pridham et al. [J. Bact., 56:107–114 (1948)] as follows: Good to fair utilization of l-arabinose, d-fructose, lactose, d-mannitol, d-melibiose, d-raffinose, l-rhamnose, sucrose, dextrose, salicin and d-xylose; poor to non-utilization of i-inositol, adonitol, dextran, d-melezitose and d-trehalose.

Morphology.—Aerial mycelium giving rise to clusters of tightly spiralled and coiled spore chains. Spores mostly short cylindrical, $0.8–1.0\mu \times 0.8–1.2\mu$. Spores surface smooth as determined by electron microscopy.

When following Pridham et al. ["A Guide for the Classification of Streptomycetes According to Selected Groups," Appl. Microbiol, 6:52–79 (1958)], the combination of tightly coiled and spiralled spore chains with gray-brown en-masse spore color places the new isolate in the "Grey" series of the section "spira." Of the species contained within this series, this new culture most closely corresponds to the concept of Streptomyces hygroscopicus. Comparison of the new culture with several NRRL, ATCC and CBS reference strains of this species confirms the identification.

A critical examination of the cultural, physiological and morphological features of the organism was made when it was grown on several media, including those recommended by Pridham et al. ["A Selection of Media for Maintenance and Taxonomic Study of Streptomyces," Antibiotics Annual (1956–1957), pp. 947–953]. Detailed observations are recorded in Tables I, II, III and IV below. Underscored descriptive colors are from the "Color Harmony Manual."

TABLE I.—CULTURAL CHARACTERISTICS OF STREPTOMYCES HYGROSCOPICUS NRRL 3111
[Incubation: 14 Days; Temperature: 28° C.]

| Medium | Amount of Growth | Aerial Mycelium and/or Spores | Soluble Pigment | Reverse Color | Remarks |
|---|---|---|---|---|---|
| Czapek's Solution Agar | Light | Aerial mycelium white becoming Fawn (4 ig) in sporulating zones. Sporulation light. | None | Cream (1½ Ca) | |
| Asparagine Dextrose Agar | Moderate | Aerial mycelium white becoming Fawn (4 ig) to Beaver (4 li) in sporulating zones. Sporulation moderate. | do | Pastel Yellow (1 db) | Spore masses becoming dark and hygroscopic. |
| Tomato Paste Agar | do | Aerial mycelium white, becoming Fawn (4 ig) to Beaver (4 li) in sporulating zones. Sporulation moderate. | do | Light Wheat (2 ea) | Spore masses strongly hygroscopic, becoming black. |
| Hickey and Tresner's Agar | do | Aerial mycelium white, becoming Fawn (4 ig) to Beaver (4 li) in sporulating zones. Sporulation good. | do | Light Wheat (2 ea) | Spore masses becoming black and hygroscopic. |
| Yeast Extract Agar | do | Aerial mycelium white, becoming Fawn (3 ig) to Beaver (3 li) in sporulation zones. Sporulation good. | do | Yellow Maple (3 ng) | Spore masses becoming black and hygroscopic. |
| Oatflake Agar | do | Aerial mycelium white, becoming Fawn (4 ig) to Beaver (4 li) in sporulation zones. Sporulation good. | do | Putty (1½ ec) | Hygroscopic character pronounced. |
| Carvajal s Oatmeal Agar | do | Aerial myceluim white, becoming Fawn (4 ig) to Beaver (4 li) in sporulation zones. Sporulation good. | do | Citron (1 gc) | Spore masses becoming black and hygroscopic. |
| Tomato Paste Oatmeal Agar | do | Aerial mycelium white, becoming Fawn (4 ig) to Beaver (4 li) in sporulation zones. Sporulation good. | Yellowish-brown; light. | Light Tan (3 gc) | Strongly hygroscopic. |
| Potato Dextrose Agar | do | Aerial mycelium white, becoming Fawn (4 ig) to Beaver (4 li) in sporulation zones. Sporulation moderate. | None | Light Wheat (2 ea) | Hygroscopic in zones of heaviest sporulation. |
| Bennett s Agar | do | Aerial mycelium white, becoming Fawn (4 ig) to Beaver (4 li) in sporulation zones. Sporulation moderate. | do | Pastel Yellow (1 db) | Hygroscopic in zones of heaviest sporulation. |
| Inorganic Salts-Starch Agar | do | Aerial mycelium white, becoming Beige (3 ge) to Fawn (3 ig) in sporulation zones. Sporulation moderate. | do | Parchment (1½ db) | Lightly hygroscopic. |

TABLE II.—Micromorphology of Streptomyces hygroscopicus NRRL 3111

Medium—Czapek's Solution Agar.
Aerial Mycelium and/or Sporiferous Structures—Aerial mycelium giving rise to clusters of tightly spiralled and coiled spore chains.
Spore Shape—Spores mostly short cylindrical.
Spore size—$0.8$–$1.0\mu \times 0.8$–$1.2\mu$.
Spore Surface—Spore surface smooth, as determined by electron microscopy.

TABLE III.—MISCELLANEOUS PHYSIOLOGICAL REACTIONS OF STREPTOMYCES HYGROSCOPICUS NRRL 3111

[Incubation Temperature: 28° C.]

| Medium | Incubation Period | Amount of Growth | Physiological Reaction |
|---|---|---|---|
| Organic Nitrate Broth | 7 Days | Heavy | Nitrates reduced to nitrites. |
| Do | 14 Days | do | Do. |
| Synthetic Nitrate Broth | 7 Days | Moderate | Nitrates not reduced to nitrites. |
| Do | 14 Days | Heavy | Do. |
| Gelatin | 7 Days | Moderate | Partial liquefaction. |
| Do | 14 Days | do | Complete liquefaction. |
| Iron-Peptone Agar | 24 Hours | do | Negative chromogenicity. |

TABLE IV

Carbon source utilization pattern of *Streptomyces hygroscopicus* NRRL 3111

[Incubation: 14 days; temperature: 28° C.]

| Carbon source: | Utilization [1] |
|---|---|
| Adonitol | 0 |
| l-Arabinose | 3 |
| Dextran | 0 |
| d-Fructose | 3 |
| i-Inositol | 1 |
| Lactose | 3 |
| d-Mannitol | 3 |
| d-Melezitose | 0 |
| d-Melibiose | 3 |
| d-Raffinose | 3 |
| l-Rhamnose | 3 |
| Salicin | 2 |
| Sucrose | 3 |
| d-Trehalose | 0 |
| d-Xylose | 2 |
| Dextrose | 3 |
| Negative control | 0 |

[1] 3=good utilization; 2=fair utilization; 1=poor utilization; 0=no utilization.

It is to be understood that for the production of the new antibiotic the present invention is not limited to this particular organism or to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure and the like.

THE FERMENTATION PROCESS

The cultivation of the new strain of *S. hygroscopicus* NRRL 3111 may take place in a variety of liquid culture media. Media which are useful for the production of the new antibiotic include an assimilable source of carbon such as starch, sugar, molasses, glycerol, etc., an assimilable source of nitrogent such as protein, protein hydrolysate, polypeptides, amino acids, corn steep liquor, etc., and inorganic anions and cations, such as potassium, sodium, calcium, sulfate, phosphate, chloride, etc. Trace elements such as boron, molybdenum, copper, etc., are supplied as needed in the form of impurities by other constituents of the media. Aeration in tanks and bottles is provided by forcing sterile air through or onto the surface of the fermenting medium. Further agitation is provided in tanks, by a mechanical impeller. An antifoaming agent, such as 1% octadecanol in lard oil may be added as needed.

INOCULUM PREPARATION

To prepare inoculum in shaker flasks, 100 ml. portions of the following liquid medium in 500 ml. flasks are inoculated with an agar slant of the culture.

| Liquid medium: | Grams per liter |
|---|---|
| Bactopeptone | 5 |
| Glucose | 10 |
| Molasses | 20 |

The flasks are incubated at about 28° C. on a reciprocating shaker and agitated vigorously for 24 to 72 hours, usually for 48 hours.

TANK FERMENTATION

For the production of the antibiotic in tank fermentators the following medium is preferably used.

| Fermentation medium: | Grams per liter |
|---|---|
| Corn steep liquor | 25 |
| Glucose | 30 |
| $(NH_4)_2SO_4$ | 3.3 |
| $CaCO_3$ | 9.0 |

Each tank is inoculated with from 0.1 to 10%, inclusive, of a culture broth fermented as described above for inoculum preparation. Aeration is supplied at the rate of 0.2–2.0 volumes, inclusive, of sterile air per volume of broth per minute and the broth is agitated by an impeller driven at about 120–160 r.p.m. The temperature is maintained at 20–35° C., usually at 28° C. The fermentation may be continued for 24 to 240 hours, at which time the mash is harvested.

PURIFICATION PROCEDURE

At harvest the fermentation broth containing the antibiotic is preferably filtered at pH 7 to remove the mycelium. Diatomaceous earth or any of the conventional filtration aids may be used to assist the filtration which is done with standard equipment. Thereafter the antibiotic may be recovered from the filtrate by adsorption on activated carbon, filtration and elution with 80% methanol at pH 3. The eluate is concentrated in vacuo to approximately 1/25 of the original mash volume and calcium ions are precipitated with sodium oxalate and removed by filtration. The filtrate is extracted with petroleum ether and then passed through a column of a cation exchange resin at neutral pH. The antibiotic is retained by the resin which is thoroughly washed with water and methanol. The antibiotic is then eluted by repeated suspension of the resin in water of acid pH and filtration. The pooled filtrates are adjusted to pH 5, filtered and lyophilized. This material is chromatographed on a cation exchange resin at pH 7 by concentration gradient elution with an aqueous solution of an inorganic salt, like $Na_2SO_4$, NaCl, KCl, KBr, LiCl etc.

Two components, designated A and B, are separated by selecting appropriate cuts and isolated by evaporation in vacuo. Substance A is crystallized as the picrolonate.

Component B from the salt gradient column is desalted by chromatography on active carbon and lyophilized. In a solvent system consisting of 90% phenol (100 parts), m-cresol (25 parts), acetic acid (4 parts), pyridine (4 parts) and water (75 parts), the paper chromatographic Rf value of the B component is about 0.40.

The crystalline picrolonate of component A is converted to the hydrochloride by passing a solution in 20% acetone through an ion exchange resin in the hydrochloride form. The product is lyophilized. Component A is composed of the elements carbon, hydrogen, nitrogen, oxygen and chlorine in substantially the following average percentages by weight.

| | |
|---|---|
| Carbon | 35.68 |
| Hydrogen | 6.04 |
| Nitrogen | 18.58 |
| Oxygen | 24.35 |
| Chlorine | 12.31 |
| Water of crystallization | 3.83 |

The neutralization equavilent is 426 and a molecular weight of 458 is found by the differential vapor pressure method. The antibiotic contains no primary amino nitrogen and no methyl groups attached to an oxygen. The average percent of methyl groups attached to a nitrogen is 1.7 (as $CH_3$. The pK values are at about 6.9 and 10.2 indicating a strongly basic character. The product has no melting point, but decomposes at about 200–215° C. It has an optical rotation of $[\alpha]_D^{25°} -58°$ (c.=1.09 in water). The antibiotic exhibits no absorption at wavelengths of light from 220 m$\mu$ to 700 m$\mu$.

An infrared absorption spectrum of component A as the hydrochloride salt in a KBr pellet is prepared in a standard manner. The compound exhibits absorption maxima in the infrared spectrum at the following wavelengths expressed in microns: 3.06, 5.84, 6.06, 6.25, 6.74, 7.24, 7.67, 8.43, 8.84, 9.36, 9.60, 10.56, 10.80. The infrared curve is shown in FIG. 1 of the accompanying drawings.

A proton magnetic resonance spectrum of component A as the hydrochloride salt is determined with a Varian A-60 spectrometer at 60 megacycles in the customary manner by dissolving in $D_2O$ (45 mg. in 0.35 ml.) containing tetramethylsilane as an internal standard. The compound has a characteristic resonance pattern with principal features occurring at the following frequencies expressed in $\delta$ (delta) units (parts per million): 3.14, 3.55, 3.73, 3.85, 4.05, 4.16, 4.30, 4.49, 4.56, 4.65, 4.74, 4.89, 5.28, 5.62, 5.77, 5.80, 8.13 p.p.m. The resonance spectrum is shown in FIG. 2 of the accompanying drawings. Acid hydrolysis and paper chromatography of component A shows that β-lysine is absent.

In a solvent system consisting of 90% phenol (100 parts), m-cresol (25 parts), acetic acid (4 parts), pyridine (4 parts) and water (75 parts) the paper chromatographic Rf value of component A is about 0.58. The behavior in paper electrophoresis indicates that the compound is a strong base.

The hydrochloride is very soluble in water, somewhat less soluble in methanol, ethyleneglycol monomethyl ether, dimethylsulfoxide, dimethylformamide and practically insoluble in other common organic solvents such as the hydrocarbons. At 25° C. the antibiotic is most stable at pH 3–5, inactivation occurs above pH 7.

The compound dialyzes readily through cellophane. This new antibiotic is positive in the following color reactions: Tollens, Fehling, Biuret, permanganate, periodic acid. The Sakaguchi, Elson-Morgan, Molisch, maltol, ninhydrin, carbazole, anthrone and $FeCl_3$ tests are negative.

Component A is clearly distinguished from other antibiotics by the characterization data given above and by its antimicrobial spectrum. The antimicrobial activity of component A is presented in the table below which shows the in vitro spectrum, that is, the zones of inhibition measured in millimeters from the edge of the agar wells to the outer limits of the inhibition zones at a concentration of 500 µg. per milliliter.

TABLE V

In vitro antimicrobial spectrum of the A component by agar diffusion method

| Organism: | Zone of inhibition at 500 µg./ml. |
|---|---|
| Bacillus cereus | 7.6 |
| Bacillus subtilis | 11.6 |
| Bacillus subtilis (pH 6 agar) | 5.4 |
| Bacillus subtilis (resistant to streptothricin) | 9.1 |
| Staphylococcus aureus (resistant to tetracyclines) | 2.1 |
| Staphylococcus aureus (strain Smith) | 6.2 |
| Staphylococcus aureus (resistant to erythromycin group) | 2.0 |
| Streptococcus pyogenes (NY–5) | 3.3 |
| Corynebacterium xerosis (NRRLB–1397) | 6.3 |
| Klebsiella pneumoniae (Friedlanders) | 6.5 |
| Klebsiella pneumoniae | 9.5 |
| Klebsiella pneumoniae "A" (Strain AD) | 11.6 |
| Alcaligenes sp. (ATCC 10153) | 6.8 |
| Escherichia coli | 6.3 |
| Escherichia coli (resistant to chloramphenicol) | 5.6 |
| Salmonella gallinarum | 7.6 |
| Pseudomonas mucidolens (ATCC 4686) | 10.7 |
| Pseudomonas aeruginosa (ATCC 10145) | 5.4 |
| Proteus vulgaris (ATCC 9484) | 5.5 |
| Proteus mirabilis (ATCC 9921) | 5.5 |

Component A is active against gram-negative and gram-positive microorganisms, such as Staphylococci, Pneumococci and Streptococci. The new antibiotic is thus potentially useful as a therapetic agent in treating bacterial infections in mammals caused by such microorganisms. The new antibiotic can be expected to be usefully employed for controlling such infections by topical application or parenteral administration.

The usefulness of the A component is demonstrated by its ability to control systemic lethal infections in mice. The new antibiotic shows high antibacterial in vivo activity in mice against Staphylococcus aureus, strain Smith, Streptococcus pyogenes C–203 and Escherichia coli, when administered by single subcutaneous dose to groups of Carworth Farms CF1 female mice, weight 18–20 grams, infected intraperitoneally with a lethal dose of these bacteria in a $10^{-2}$ to $10^{-5}$ trypticase soy broth (TSP) dilution of a five-hour TSP blood culture.

Table VI shows the in vivo antibacterial activity of Component A.

TABLE VI.—IN VIVO ANTIBACTERIAL ACTIVITY OF AC-F 541-A ANTIBIOTIC

| Test System | Dosage [1] mg./kg. body wt. | S/T [2] |
|---|---|---|
| Staphylococcus aureus, strain Smith | 40 | 5/5 |
|  | 20 | 3/5 |
| Streptococcus pyogenes C–203 | 160 | 3/5 |
| Escherichia coli | 20 | 5/5 |
|  | 20 | 5/5 |

[1] The antibiotic was administered in a single subcutaneous dose.
[2] No. of surviving mice/number of treated mice. In controls, all injected mice died.

The invention will be described in greater detail in conjunction with the following specific examples.

EXAMPLE 1

Inoculum preparation

A typical medium used to grow the primary inoculum is prepared according to the following formula:

| | Grams |
|---|---|
| Bactopeptone | 5 |
| Glucose | 10 |
| Molasses | 20 |
| Water to 1000 ml. | |

A yeast-malt agar slant of S. hydroscopicus NRRL 3111 is incubated for a week. At this time the spores and mycelium are transferred to two 500 ml. flasks which contain 100 ml. of the above medium. The flasks are placed on a reciprocating shaker and agitated vigorously for 48 hours, at 28° C. The flask inocula are transferred to 9 liter bottles, which contain 6 liters of the above liquid medium. These bottles are aerated for 24 hours to encourage further growth. At the end of this time the 9 liter bottles are used to seed fermentor tanks.

EXAMPLE 2

Fermentation

A fermentation medium is prepared according to the following formula:

|  | Grams |
| --- | --- |
| Corn steep liquor | 25 |
| Glucose | 30 |
| $(NH_4)_2SO_4$ | 3.3 |
| $CaCO_3$ | 9 |

Water to 1000 ml.

The fermentation medium is sterilized at 120° C. with steam at 15 pounds pressure for 60 minutes. The pH of the medium before and after sterilization is between 6.3 and 6.5. 400 liters of the sterile medium in 200 gallon fermentors are inoculated with 12 liters of the bottle inoculum described above and the fermentation is carried out at 28° C. for 40-100 hours. The medium is agitated by an impeller operating at 130 revolutions per minute. At the end of the fermentation the mash is assayed.

EXAMPLE 3

Isolation

Four hundred and thirty liters of fermented mash at pH 7.5 is adjusted to pH 7.0 and diatomaceous earth is added in the proportion 3% weight per volume. The broth is filtered, the filter cake is washed with water and the pad is discarded. The water wash is pooled with the filtrate (total volume 400 liters) and 8.0 kg. of activated carbon is added. After filtration the antibiotic is eluted from the carbon by suspension in 200 liters of 80% methanol which is adjusted to pH 3 with HCl. The carbon is removed by filtration and discarded. The filtrate is concentrated to 19 liters (total solids 960 g.). Calcium ions are precipitated with a saturated aqueous solution of sodium oxalate and removed by filtration. The filtrate is percolated through a column of ion exchange resin Amberlite IRC-50 (200-400 mesh) at pH 6.5. After washing thoroughly with water and methanol, the antibiotic is eluted from the resin by repeated suspension in water of pH 2.5 and filtration. The pooled filtrates (total volume 4.3 liters) are adjusted to pH 5 with ion exchange resin Amberlite IR-45, filtered and lyophilized (total solids 208 g.). The product is chromatographed on ion exchange resin Amberlite CG-50 (200-400 mesh) by concentration gradient elution with an aqueous solution of KCl. The two components bands A and B are separated and individually isolated by evaporation. After extracting the activity from the dry product (28 g.) with methanol (275 ml.), antibiotic AC-541-A (2.3 g.) is crystallized as the picrolonate from aqueous acetone. The derivative is recrystallized from the same solvent (yield 1.9 g.). The crystalline picrolonate is then converted to the hydrochloride by passing an aqueous acetone solution through ion exchange resin Amberlite IR-45 in the hydrochloride form. The effluent is concentrated and lyophilized (yield 1 g.). The chemical analysis of this product as the hydrochloride and its other chemical, physical and biologcal properties have already been described.

What is claimed is:

1. A substance antibiotic AC-541-A effective in inhibiting the growth of gram-positive and gram-negative bacteria, the hydrochloride of which is characterized by the following properties:
    (a) readily soluble in water, somewhat less soluble in lower alcohols, ethyleneglycol monomethyl ether, dimethylsulfoxide and dimethylformamide and insoluble in other common organic solvents,
    (b) being basic and having pK values of 6.9 and 10.2,
    (c) having an optical rotation $[\alpha]_D^{25°}$ —58° (c.=1.09 in water),
    (d) an $Rf$ value of 0.58 in a solvent system consisting of 90% phenol (100 parts), m-cresol (25 parts), acetic acid (4 parts), pyridine (4 parts) and water (75 parts),
    (e) containing the elements carbon, hydrogen, nitrogen, oxygen and chlorine in substantially the following average percentages by weight:

| | |
| --- | --- |
| Carbon | 35.68 |
| Hydrogen | 6.04 |
| Nitrogen | 18.58 |
| Oxygen | 24.35 |
| Chlorine | 12.31 |
| Water of crystallization | 3.83 |

(f) characteristic absorption in the infrared region of the spectrum as shown in FIG. 1, and
    (g) a proton resonance spectrum as shown in FIG. 2.

References Cited

Miller: The Pfizer Handbook of Microbial Metabolites, McGraw-Hill Book Company, Inc., New York, N.Y., 1961, p. 591.

ALBERT T. MEYERS, Primary Examiner

J. D. GOLDBERG, Assistant Examiner